United States Patent
Karis

(10) Patent No.: US 9,728,220 B2
(45) Date of Patent: *Aug. 8, 2017

(54) CHARGE CONTROL AGENT FOR FLUID DYNAMIC BEARING MOTOR LUBRICANT

(71) Applicant: Western Digital Technologies, Inc., San Jose, CA (US)

(72) Inventor: Thomas Edward Karis, Aromas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,422

(22) Filed: May 18, 2016

(65) Prior Publication Data

US 2016/0260453 A1    Sep. 8, 2016

Related U.S. Application Data

(63) Continuation of application No. 14/495,124, filed on Sep. 24, 2014, now Pat. No. 9,368,150.

(51) Int. Cl.
*G11B 19/20*    (2006.01)
*H02K 7/08*    (2006.01)
(Continued)

(52) U.S. Cl.
CPC ....... *G11B 19/2036* (2013.01); *C10M 105/36* (2013.01); *C10M 109/00* (2013.01);
(Continued)

(58) Field of Classification Search
None
See application file for complete search history.

(56) References Cited

U.S. PATENT DOCUMENTS 5,783,882 A    7/1998  Brezoczky et al.
5,844,748 A    12/1998 Dunfield et al.
(Continued)

FOREIGN PATENT DOCUMENTS

DE    10 2011 008 546 A1    7/2012

OTHER PUBLICATIONS

Klaassen, et al.; Charge Generation and Bleed-Off in Spindle Motors with Ceramic Ball Bearings; Abstract Only; Magnetics, IEEE Transactions on; vol. 39, No. 5; dated Sep. 2003; 1 page.
(Continued)

*Primary Examiner* — Craig A. Renner
(74) *Attorney, Agent, or Firm* — Patterson & Sheridan, LLP

(57) ABSTRACT

Embodiments disclosed herein generally relate to magnetic recording systems having a spindle motor and, more particularly, to an optimized lubricant for bearings within the spindle motor. A lubricant used in a fluid dynamic bearing motor has an antioxidant additive and a charge control agent dissolved in a diester base oil. The charge control agent is chemically attached to the same diacid reactant used in the diester lubricant base oil, and is prepared through an esterification reaction. The charge control agent is then dissolved in the lubricant base oil. The charge control agent is soluble in the lubricant, and is resistant to free radical oxidation. The charge control agent effectively controls the charge of the lubricant by creating electron donor/acceptor sites in the lubricant, facilitating an independent electronic pathway through the lubricant.

20 Claims, 7 Drawing Sheets

(51) Int. Cl.
*C10M 109/00* (2006.01)
*H01B 1/12* (2006.01)
*C10M 129/72* (2006.01)
*C10M 169/04* (2006.01)
*C10M 105/36* (2006.01)
*C10N 40/02* (2006.01)

(52) U.S. Cl.
CPC ........ *C10M 129/72* (2013.01); *C10M 169/04* (2013.01); *H01B 1/12* (2013.01); *H02K 7/08* (2013.01); *H02K 7/085* (2013.01); *C10M 2207/021* (2013.01); *C10M 2207/025* (2013.01); *C10M 2207/123* (2013.01); *C10M 2207/1233* (2013.01); *C10M 2207/1273* (2013.01); *C10M 2207/282* (2013.01); *C10M 2207/285* (2013.01); *C10M 2207/2825* (2013.01); *C10N 2040/02* (2013.01); *C10N 2230/00* (2013.01); *C10N 2230/10* (2013.01); *C10N 2240/02* (2013.01); *C10N 2240/10* (2013.01); *C10N 2240/204* (2013.01); *F16C 2370/12* (2013.01)

(56) References Cited

U.S. PATENT DOCUMENTS

| | | |
|---|---|---|
| 5,886,854 A | 3/1999 | Diaz et al. |
| 5,907,456 A | 5/1999 | Khan et al. |
| 5,940,246 A | 8/1999 | Khan et al. |
| 6,335,310 B1 | 1/2002 | Suekuni et al. |
| 6,851,861 B2 | 2/2005 | Price et al. |
| 7,212,376 B2 | 5/2007 | Burns et al. |
| 7,365,939 B2 | 4/2008 | Gomyo et al. |
| 8,293,693 B2 | 10/2012 | Kamimura et al. |
| 9,368,150 B2 * | 6/2016 | Karis ................. G11B 19/2036 |
| 2005/0068667 A1 | 3/2005 | Burns et al. |
| 2007/0183089 A1 | 8/2007 | Khan et al. |
| 2012/0068564 A1 | 3/2012 | Khan |

OTHER PUBLICATIONS

Surfactants in Tribology; vol. 3; dated Mar. 20, 2013; pp. 437-438.
Thomas Edward Karis, "Surfactants for Electric Charge and Evaporation Control in Fluid Bearing Motor Oil," Surfactants in Tribology; Mar. 20, 2013; pp. 437-438; vol. 3; CRC Press; Boca Raton, FL, USA.

* cited by examiner

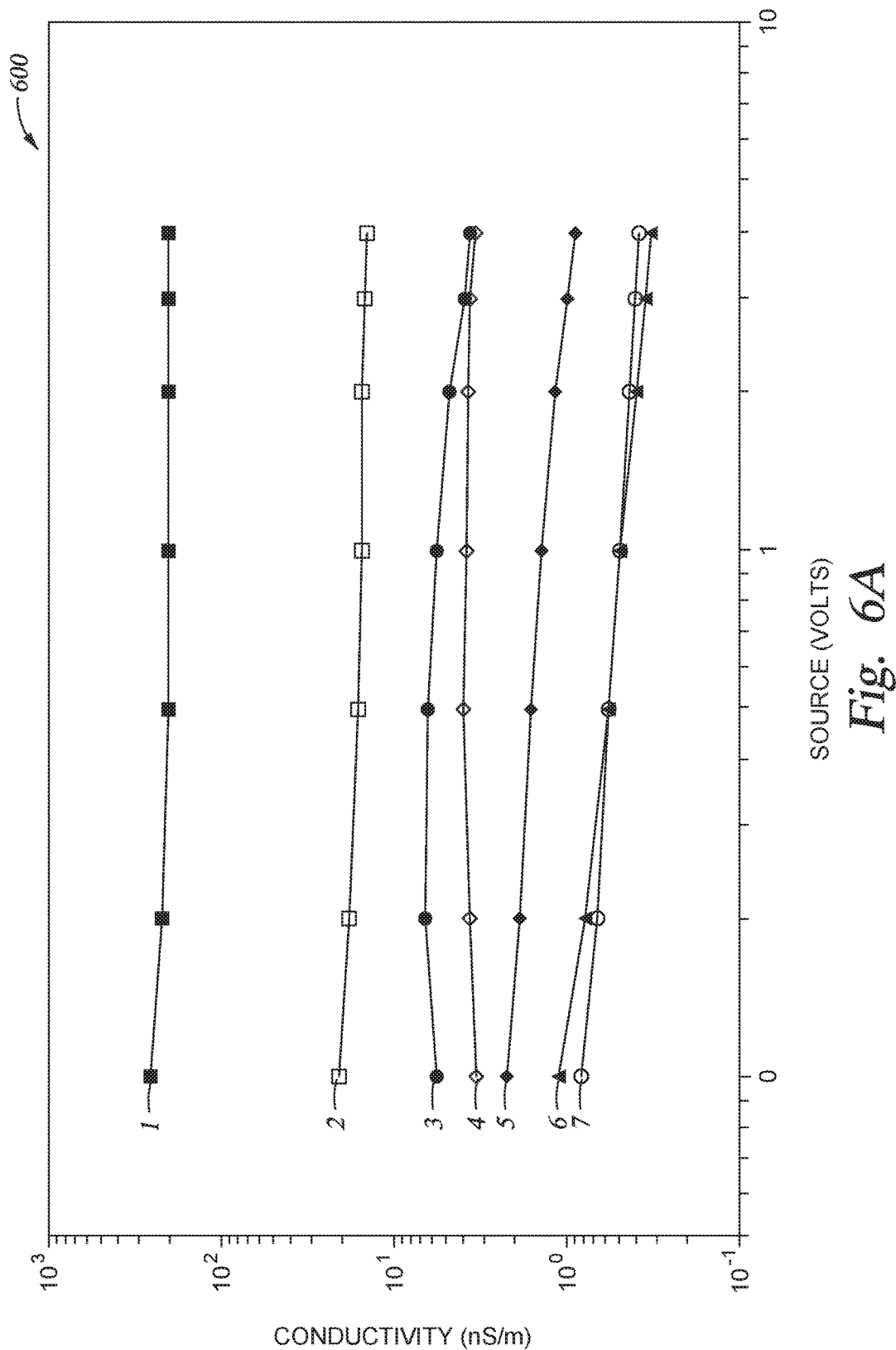

CHARGE CONTROL AGENT FOR FLUID DYNAMIC BEARING MOTOR LUBRICANT

CROSS-REFERENCE TO RELATED APPLICATIONS

This application is a continuation application of co-pending U.S. patent application Ser. No. 14/495,124, filed on Sep. 24, 2014, which is incorporated herein by reference.

BACKGROUND

Field

Embodiments disclosed herein generally relate to magnetic recording systems with improved reliability having a spindle motor and, more particularly, to an optimized lubricant for bearings within the spindle motor.

Description of the Related Art

With the advent of interface voltage control (IVC), it is more important than ever to provide a fluid dynamic bearing spindle motor in a magnetic recording system with stable electrical properties. In particular, the fluid bearing oil, or lubricant, is the main contributor to variation in the interface voltage with respect to time and temperature. The main reason for the changes in electrical properties of the fluid bearing motor lubricant with respect to time is that the antioxidant is also a charge control agent. As the antioxidant scavenges free radicals, it undergoes chemical changes that alter the charge transfer properties. Thus, the voltage across the fluid bearing drifts, which may lead to slider disk interaction gradually over time.

Therefore, there is a need for a stable charge control agent that is resistant to free radical oxidation.

SUMMARY

Embodiments disclosed herein generally relate to magnetic recording systems having a spindle motor and, more particularly, to an optimized lubricant for bearings within the spindle motor. A lubricant used in a fluid dynamic bearing motor has an antioxidant additive and a charge control agent dissolved in a diester base oil. The charge control agent is chemically attached to the same diacid reactant used in the diester lubricant base oil, and is prepared through an esterification reaction. The charge control agent is then dissolved in the lubricant base oil. The charge control agent is soluble in the lubricant, and is resistant to free radical oxidation. The charge control agent effectively controls the charge of the lubricant by creating electron donor/acceptor sites in the lubricant, facilitating an independent electronic pathway through the lubricant.

In one embodiment, a fluid dynamic bearing motor comprises a slider bearing coupled to the fluid dynamic bearing motor and a central axis. A spindle shaft is coaxial with the center axis, and one or more fluid bearings are adjacent the shaft. A lubricant is interposed between the bearings and the shaft. The lubricant includes a soluble charge control agent of chemically similar structure and polarity, and has a separately dissolved antioxidant additive. The lubricant and the charge control agent have the same diacid or chemically similar reactant used to form the ester.

In another embodiment, a magnetic recording system comprises an actuator, an actuator arm coupled to the actuator, a spindle disposed below the actuator arm, one or more magnetic media disposed on the spindle, and a fluid dynamic bearing motor coupled to the spindle and adapted to actuate the spindle. The fluid dynamic bearing spindle motor further comprises a central axis, a spindle shaft coaxial with the central axis, one or more bearings adjacent the shaft and a lubricant interposed between the one or more bearings and the shaft. The lubricant includes a soluble charge control agent chemically attached thereto in part, and has a distinct antioxidant additive. The lubricant and the charge control agent have the same diacid or chemically similar reactant used to form the ester.

BRIEF DESCRIPTION OF THE DRAWINGS

So that the manner in which the above recited features discussed herein can be understood in detail, a more particular description of the above may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

FIG. 6A is a graph showing liquid lubricant conductivity versus source voltage.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although the embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
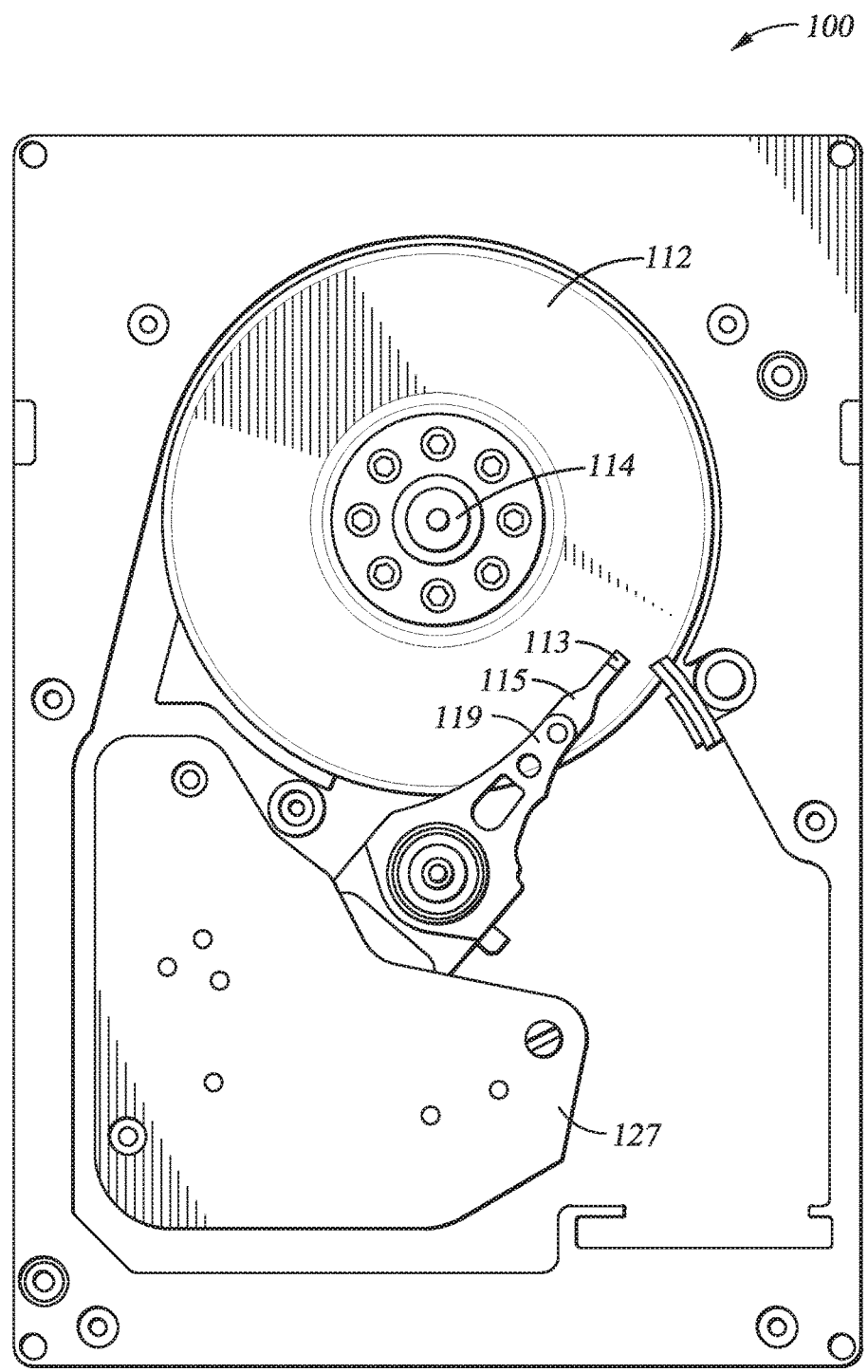
FIGS. 1A-1B illustrate a disk drive system.
Figure 1B:
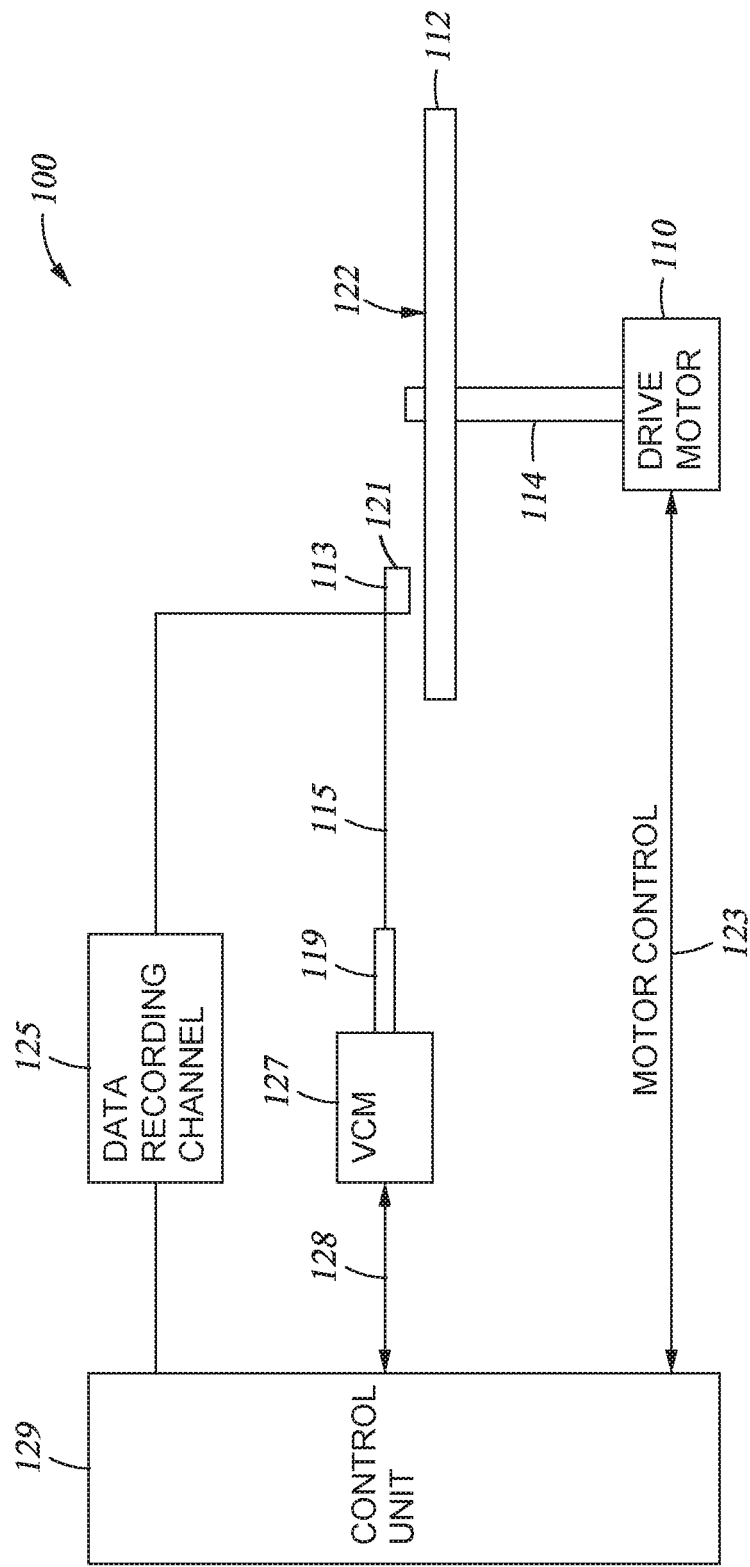

FIGS. 1A and 1B illustrate a disk drive 100. FIG. 1A shows a top view of the disk drive 100. FIG. 1B shows a schematic side view of the disk drive 100. As shown, at least one rotatable magnetic disk or rotatable magnetic media 112 is supported on a spindle 114 and rotated by a drive motor, or a fluid dynamic bearing spindle motor 110. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk 112 rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by a control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation through signals such as access control signals and internal clock signals that are generated by the control unit 129. Typically, the control unit 129 includes logic control circuits, memory and a microprocessor. The control unit 129 generates control signals to control various system operations such as drive motor control signals on line 123 and head position and seek signals on line 128. The signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders. Though a disk drive 100 is illustrated, it is to be understood that any magnetic reading system, such as a hard disk drive, could be utilized and is not limited to being a disk drive.

Figure 2:
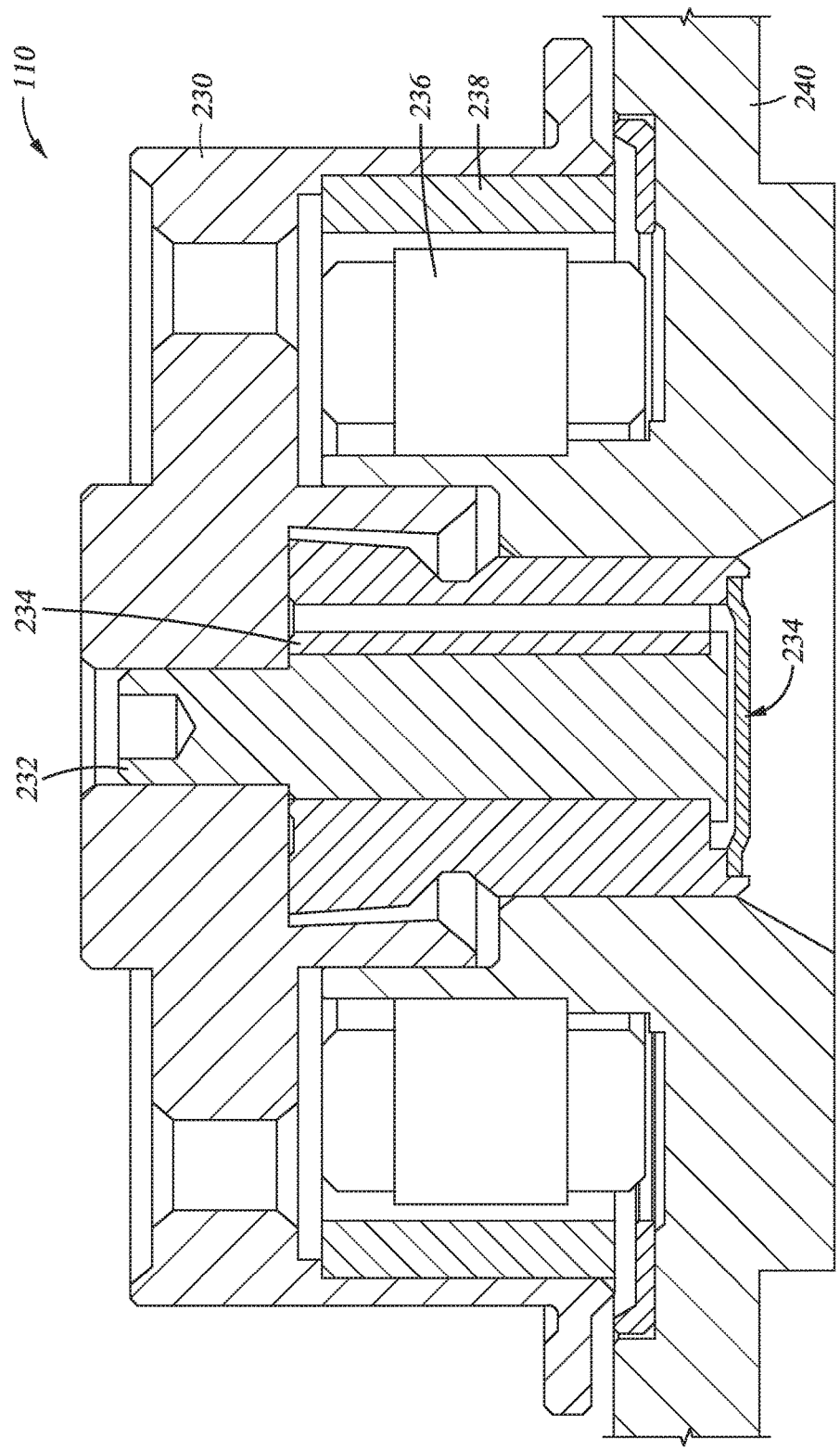
FIG. 2 illustrates a fluid dynamic bearing motor, according to one embodiment.

FIG. 2 shows a cross sectional view of one embodiment of a fluid dynamic bearing motor 110 used in disk drive 100. The fluid dynamic bearing motor 110 includes a hub 230 and a slider bearing. A central axis runs vertical through the center of the motor, and a spindle shaft 232 is coaxial with the central axis. Located on both sides of the shaft 232 or to one side of the shaft 232 are one or more bearings 234. Adjacent the one or more bearings 234 is a stator 236, and adjacent the stator 236 is a magnet 238. The left side of the central axis and the right side of the central axis may mirror one another, and as such, one stator 236 and one magnet 238 are located on both sides of the spindle shaft 232. The stators 236, the magnets 238 and other components of the fluid dynamic bearing motor 110 are disposed on a baseplate 240. During operation, the fluid dynamic bearing motor 110 causes the spindle shaft 232 to rotate at a high rate. To ensure the spindle shaft 232 rotates freely, a lubricant is used. The lubricant is typically placed between the spindle shaft 232 and the hub bearings 234, which allows the spindle shaft 232 to rotate unhindered. The fluid dynamic bearing motor 110 may vary in different hard drives, and it not limited to being a specific type of motor. For example, the fluid dynamic bearing motor 110 may be a tied-shaft motor or a rotating-shaft motor. The fluid dynamic bearing motor 110 may also have a cap (not shown) around the spindle shaft 232, and/or a seal (not shown) on the bottom of the spindle shaft 232.

The lubricant acts as a dielectric in the fluid bearing. Electric charge storage in the lubricant is typically ionic and/or electronic. As the motor 110 is operating, the charge stored across the lubricant dissipates by ionic mobility and/or electronic charge transfer through the lubricant. However, the electrochemistry of the lubricant changes over time due to chemical reactions taking place and evaporation loss. For example, the rotation of the one or more magnetic discs or magnetic media results in a build-up of static electricity in the lubricant, creating a voltage on the discs and generating an electric field between the read/write slider and the disk. IVC helps to control the voltage across the slider disk interface by intentionally offsetting the motor voltage with the measured voltage. The resulting voltage is the ideal amount of voltage for optimum reliability and minimum wear of the read/write head carbon overcoat. If the voltage offset is determined to be different than the manufactured settings or the optimum interface voltage, the head disk interface reliability is compromised.

To help control the voltage of the motor and the electrochemistry of the lubricant, the lubricant used in the fluid dynamic bearing motor has several additives, one of which being an antioxidant. Other additives may be used in addition to the antioxidant additive, such as anti-corrosion additives and anti-wear additives. The additives assist in carrying electrical charges through the lubricant and discharging the electrostatic charge build-up; however, the additives may also contribute to charge spearation. The antioxidant additive helps to limit the electric charge accumulation and thereby to maintain a constant voltage across the lubricant, but the antioxidant reacts with carbon radicals and oxidation products and degrades over time. Hindered phenols acts as free radical scavengers and are transformed to reaction products, which is one example of a chemical change the antioxidant undergoes. Antioxidant chemical reactions alter the molecular structure of the antioxidant through the cleavage of chemical bonds, making the antioxidant less effective at controlling the electric charge in the lubricant. As the antioxidant additive chemically changes, the charge and voltage across the lubricant also change. Thus, to help maintain a constant voltage across the lubricant, another stable charge control agent that does not degrade over time is included in the bearing oil along with the antioxidant.

Figure 3:
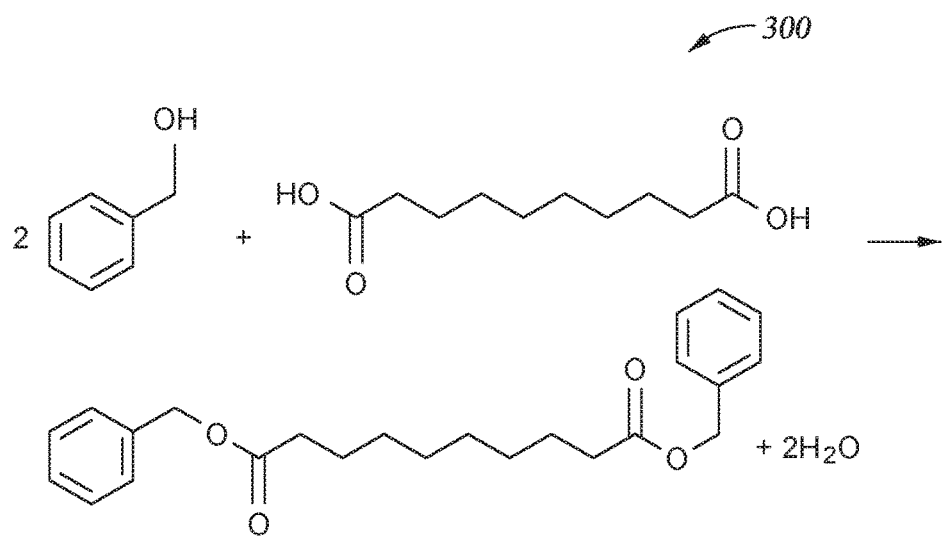
FIG. 3 illustrates a general esterification chemical reaction.

A thermally stable charge transfer agent is chemically attached to the same diacid reactant or chemically similar core molecule of the lubricant base oil, forming the charge control agent. Some percent by weight of the charge control agent is then added to the lubricant. Chemically attaching the charge transfer agent to the same diacid or chemically similar stable core structure as that of the lubricant base oil renders the charge control agent the same or better chemical stability as the base oil rather than chemically changing or degrading over time like the antioxidant. For example, a charge transfer agent can be chemically attached to the lubricant through esterification, and is prepared by esterifying benzyl alcohol with sebacic acid, a dicarboxylic acid, to form bis(benzyl) sebacate (BBS). A general chemical reaction 300 of this esterification reaction using one or more benzyl alcohols and sebacic acid as the reactants is shown in FIG. 3. The reaction 300 may yield other products in addition to BBS, such as H₂O, and other conditions such as organic solvents, light or a specific temperature, or catalysts may be required to catalyze the reaction. A naphthyl group or other aromatic compound may be used in place of the benzyl group, with a similar reaction to reaction 300 of FIG. 3 taking place using one or more naphthyl alcohols or another aromatic alcohol as a reactant. Anthracenemethanol or pyrenemethanol may also be used as a reactant in the esterification reaction 300. BBS is soluble in the typical fluid dynamic bearing motor lubricant di(2-ethylhexyl) sebacate (DOS). DOS may include one or more other additives dissolved in it to improve the overall function of the lubricant and motor. Sebacic acid is also one of the reactants used to form DOS, and therefore, both DOS and BBS have the same diacid reactant. The charge control agent used is not limited to being BBS, and may be an alkyl ester of a larger polycyclic aromatic hydrocarbon alcohol which is solubilized in the lubricant base oil by the functionalization with alkyl esters. A polycyclic aromatic hydrocarbon acid may be reacted with an alkanol being a mono alcohol, diol or polyol to achieve an equivalent chemically similar and ester oil compatible charge transfer agent. The reaction is not limited to being an esterification reaction and an equivalent covalent or other chemical bonding method may be used.

BBS is a successful charge control agent because it creates donor/acceptor sites in the lubricant by utilizing the semi-conducting properties of the aromatic ring, and thus, facilitates an independent electronic pathway through the lubricant. The benzyl or naphthyl group of BBS acts as the charge transfer agent, which forms donor/acceptor sites to be populated by holes/electrons. Polycyclic aromatic hydrocarbon groups are chemically stable aromatic compounds that form charge hopping sites, and are able to change their electronic orbitals through accepting/donating electrons. The donor/acceptor sites on the aromatic structure are effective at transporting electrons through the lubricant, and charge generation in the aromatic structure is stable with regard to time. This is due to the molecular structure of the aromatic compound, which is resistant to free radical oxidation. The structure is resistant to free radical oxidation because delocalized electrons for a resonance hybrid structure. The resonance energy makes cleavage of the chemical bonds of the aromatic structure difficult.

However, polycyclic aromatic hydrocarbons are generally insoluble in the lubricant base oil. The polycyclic aromatic hydrocarbon is non-polar and the base oil is of intermediate polarity due to the ester group. To make the solution soluble, the charge control agent is chemically reacted with the diacid of the lubricant base oil. Chemically attaching the aromatic group to the diacid or chemically similar core molecule of the lubricant base oil to form the charge control agent solubilizes the aromatic group into the lubricant base oil, rendering the charge control agent soluble in the lubricant base oil. Other substituents may be on the lubricant and the charge control agent will still be effective, so long that the same core molecule, such as a dicarboxylic acid or reactant of equivalent or comparable polarity, is used in both the charge control agent and the lubricant. Furthermore, adding a percent by weight of the charge control agent to the lubricant, such as about 3% weight BBS in the BBS/DOS solution, allows the charge control agent to remain chemically stable relative to the antioxidant additive while still providing an independent electronic pathway through the lubricant, effectively conducting charge electronically through the lubricant. By chemically attaching the charge transfer agent to the lubricant itself, the various additives of the lubricant are able to be combined while remaining soluble and stable, the charge of the lubricant is successfully controlled, and a constant voltage is maintained across the lubricant.

In order for the charge control agent to work as desired, some minor component additives of DOS, such as phenols, epoxy compounds and 5meBTA, may be removed or forgone to eliminate sources of ions. This allows for the charge control agent to provide a non-ionic return path for electrons through the lubricant, effectively stabilizing the voltage in the fluid dynamic bearing motor. Providing the non-ionic return path for electrons through the lubricant in turn provides stable electrical properties to the fluid dynamic bearing motor and enhances the effectiveness of IVC. The charge control agent is successful in helping to control and discharge the electric charge build-up in the lubricant and helping to maintain a constant voltage across the lubricant.

Figure 4A:
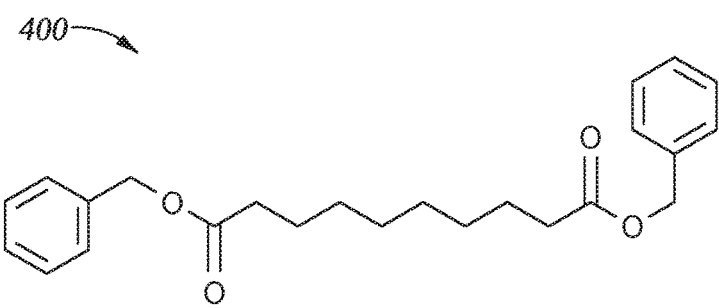
FIG. 4A is the chemical structure of dibenzyl sebacate.
Figure 4B:
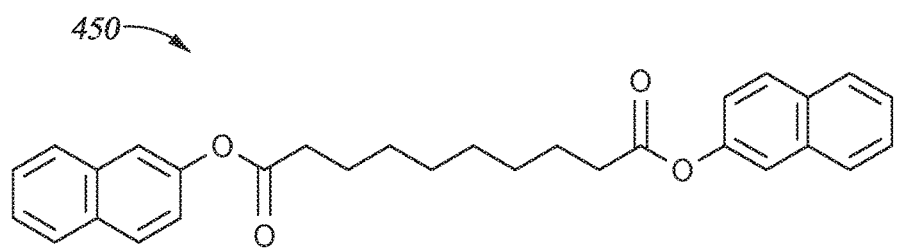
FIG. 4B is the chemical structure of dinaphthyl sebacate.

FIGS. 4A and 4B illustrate specific chemical structures of the charge control agent bis(benzyl)sebacate, BBS. FIG. 4A shows the chemical structure of BBS 400, which is the soluble charge control agent used in one embodiment. The general esterification reaction 300 illustrated in FIG. 3 yields the product BBS 400. In BBS 400, the benzyl groups act as the charge transfer agent. FIG. 4B shows the chemical structure of dinaphthyl sebacate (DNS) 450, which is the soluble charge control agent used in another embodiment. DNS 450 is formed through the same esterification process as BBS 400 using molar excess of naphthol as one of the reactants. In DNS 450, the naphthyl group acts as the charge transfer agent. Both BBS 400 and DNS 450, when added to DOS, are successful in reducing electrostatic charge build-up and increasing the overall conductivity of the lubricant. BBS/DOS and DNS/DOS solutions are able to be used in any of the above mentioned types of motors, are not limited to being used in the fluid dynamic bearing motor 110 of FIG. 2.

Figure 5:
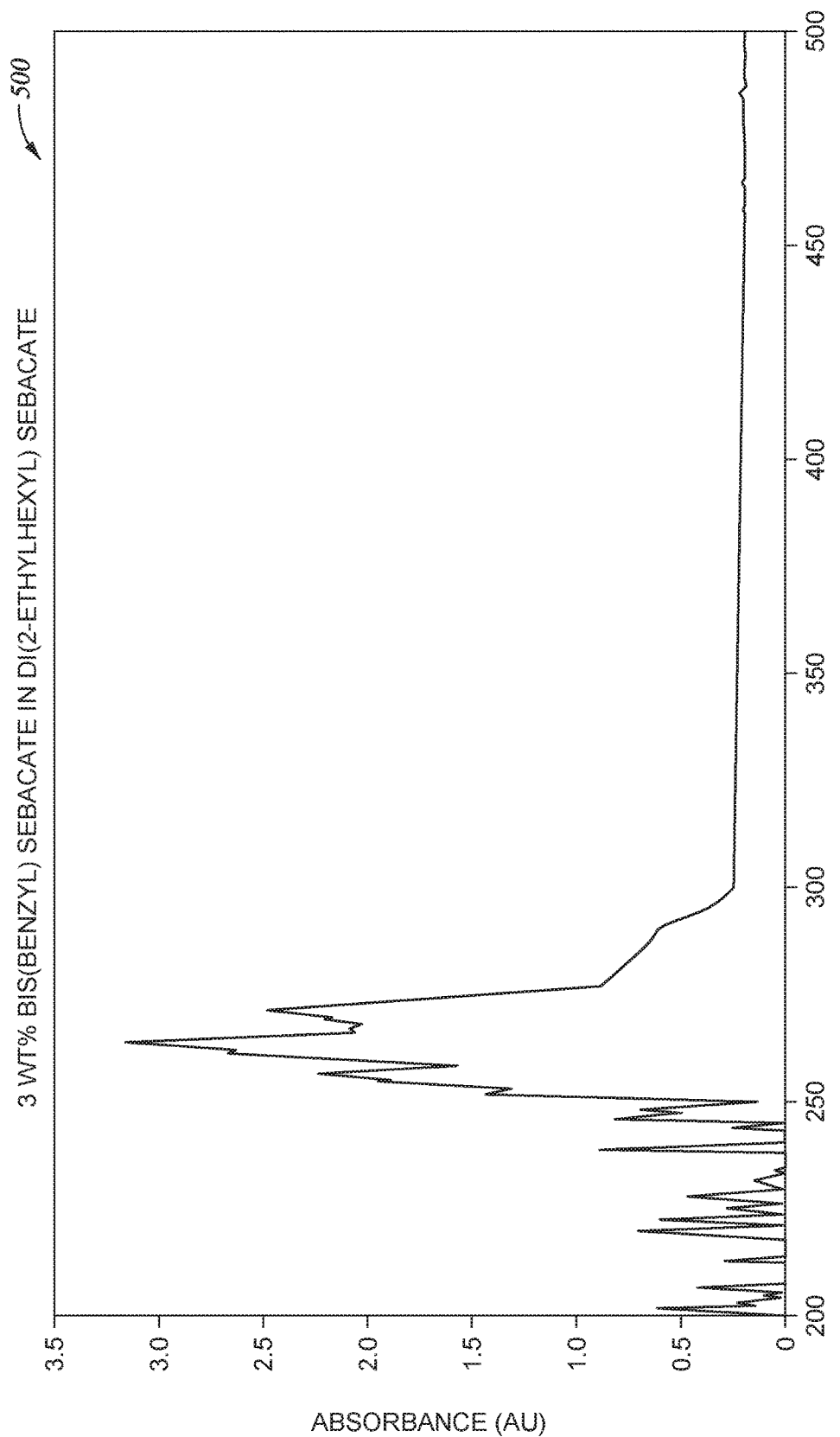
FIG. 5 is the UV/VIS spectrum of the BBS/DOS solution.

In one embodiment, the concentration of soluble charge control agent BBS added to the lubricant DOS is 3% by weight. With this concentration of BBS in DOS, the resultant solution is clear, indicating complete solubility. A comparison of the electrostatic voltage measured was made between the BBS/DOS solution and pure DOS using an electrostatic voltmeter on the free surface of the oil in a glass vial. It was found that the BBS/DOS solution had an electrostatic voltage of −600V compared to an electrostatic voltage of −1200V for the pure DOS. The conductivity between the BBS/DOS solution and the pure DOS was also compared using a commercial conductivity meter with cylindrical electrodes. The BBS/DOS solution had a conductivity of 0.5 nS/m compared to only 0.18 nS/m for the pure DOS. FIG. 5 is a UV/VIS spectrum 500 of the BBS/DOS solution with a pure DOS sample as the blank. As seen from the UV/VIS spectrum 500, the $\lambda_{max}$ value is approximately 260 nm and the absorbance is approximately 3.2 AU.

Other reactants that may be used to form the charge control agent are aryl esters. Aryl esters shown in Table 1 were synthesized with diacid core molecules sebacic acid and adipic acid. In pure form, the symmetric aryl esters, with the same group attached to both ends of the diacid, dibenzyl sebacate, diphenethyl sebacate, and dinaphthyl sebacate are solid at room temperature, and are useful as soluble charge control additives. The asymmetric aryl esters (benzyl, 2-ethylhexyl)sebacate, (phenethyl, 2-ethylhexyl)sebacate, and (phenethyl, 2-ethylhexyl)adipate are liquids at room temperature. The asymmetric aryl esters may be useful as a conductive fluid lubricant without the necessity to dissolve them in a base oil. The asymmetric aryl ester may be used as the base oil with optional antioxidant additives. All of the aryl esters are completely soluble in the base oil di(2-ethylhexyl)sebacate at least up to 5% by weight. Concentration of the aryl ester charge control additives is 0.1 to 10% by weight, and preferably between 1 and 5% by weight. Asymmetric aryl/alkyl ester charge control additives that are liquid at room temperature may be used as the lubricant base oil with a concentration of 90 to 100% by weight. The diacid core molecule used may be a mono-acid or a poly-acid.

Table 1 below shows the molecular structures of the base oil di(2-ethylhexyl)sebacate, the aryl esters synthesized on the sebacate core molecule, and an aryl ester with a smaller adipate core used in one embodiment.

The electrical properties of the aryl esters and formulated oils shown in Table 1 were measured by saturating a 1 inch disk of filter paper (0.18 mm thick) with the lubricant and charge control agent solution. A parallel plate test cell was formed by clamping the oil saturated filter paper between two mirror polished SUS304 stainless steel disks. The test cell was attached to an electrometer. The resistance of the cell was measured with a source voltage between 0.1 and 4 volts. After discharging the cell by grounding the plates together, the charge flow into the cell was measured for two minutes after the application of a 1 volt source. The conductivity was calculated from the resistance using the filter paper thickness and the nominal area corrected for porosity

TABLE 1

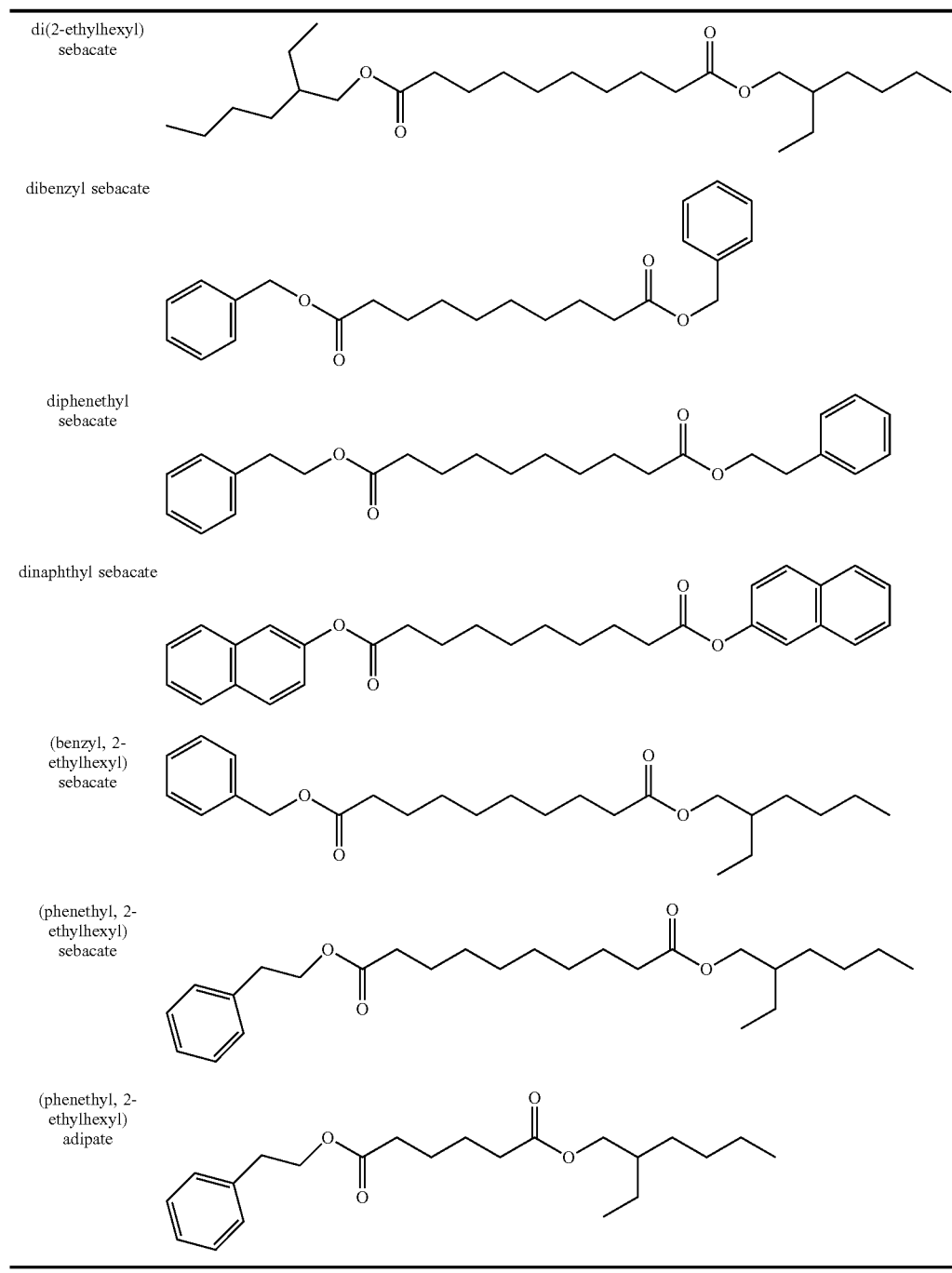

of the filter paper. The relative permittivity was calculated from a curve fit to derive the resistor-capacitor (RC) time constant. The effective area was determined by matching the known relative permittivity of the di(2-ethylhexyl) sebacate.

Figure 6B:
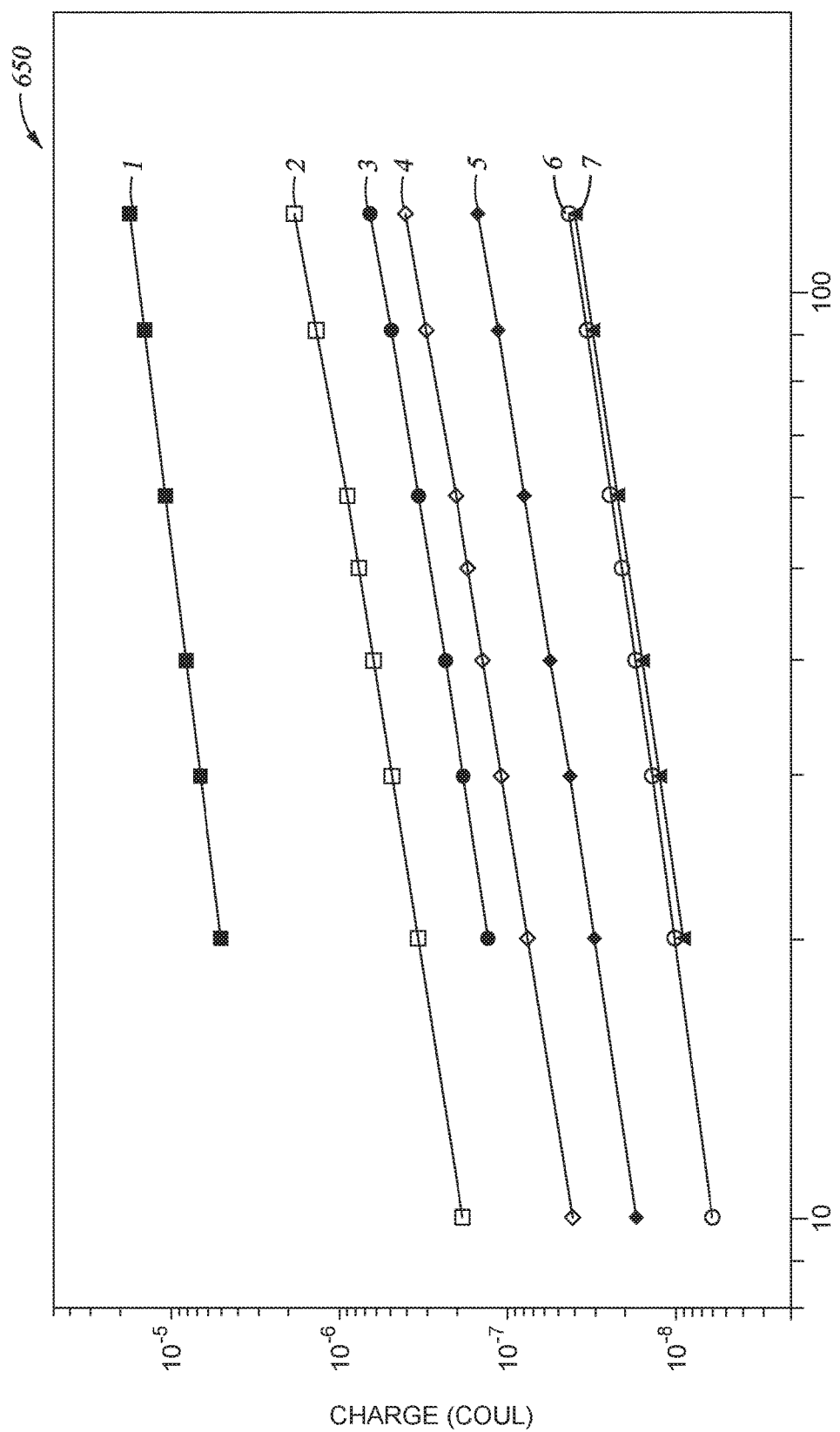
FIG. 6B is a graph showing charge in the liquid lubricant versus time with source at 1 volt.

FIGS. 6A-6B show the liquid lubricant conductivity versus source voltage and charge in the liquid lubricant versus time for several of the aryl modified charge control oils compared with the pure base oil and two types of oils that were tested in fluid bearing motor for disk drives. FIG. 6A shows the liquid lubricant conductivity versus source voltage plot 600. FIG. 6B shows the charge in the liquid lubricant versus time plot 650. In FIGS. 6A-6B, line 1 represents 0.5% STADIS 450 in neopentyl glycol dicaprate (NPG), line 2 represents (benzyl, 2-ethylhexyl) sebacate, line 3 represents 2% Vanlube 9317 in NPG, line 4 represents 5% dinaphthyl sebacate in DOS, line 5 represents 1% dinaphthyl sebacate in DOS, line 6 represents NPG base oil, and line 7 represents DOS base oil.

The 0.5% STADIS 450 (Octel Starreon L. L. C., 8375 S. Willow St., Littleton, Colo. 80124) in NPG base oil was highly conductive but the accumulated charge is so high that the stored electrical energy is capable of damaging the magnetic recording interface. The conductivity of the NPG base oil is so low that a high voltage is built up across the bearing, which degrades the reliability of the head disk interface. The combination of 2% Vanlube 9317 (50 percent by weight reaction mixture of dioctyl diphenyl amine and phenyl naphthyl amine in a tetraester oil carrier, R. T. Vanderbilt Corp.) in NPG is known to provide both sufficient conductivity and acceptably low permeability for fluid bearing motors in magnetic recording systems. However, Vanlube 9317 is an antioxidant and is subject to chemical reaction with carbon radicals and oxidation products over time, and thus, is an unstable species to rely on for long term stability of charge control and interface reliability.

The most promising chemically stable aryl charge control agent is the dinaphthyl sebacate, represented by line 4 and at 5% by weight in DOS in FIGS. 6A-6B. The electrical properties of the 5% by weight formulation are sufficiently close to those of the 2% Vanlube 9317 in NPG. Therefore the 5% by weight of dinaphthyl sebacate can provide a more stable voltage and reliable magnetic recording interface. Also shown in FIGS. 6A-6B is the (benzyl, 2-ethylhexyl) sebacate. This asymmetric aryl/alkyl ester may be useful alone as a formulated base oil where a highly conductive bearing oil or lubricant is desirable in disk drives or other electromechanical devices.

Table 2 shows the conductivity and relative permittivity of typical fluid bearing base oils, formulated oils, and aryl ester charge control additives. The base oil is either neopentyl glycol dicaprate (NPG) or di(2-ethylhexyl) sebacate (DOS). The conductivity in Table 2 was measured at 1 volt.

TABLE 2

| Additive Compound | Percent by Weight | Base Oil | Conductivity (nS/m) | Relative Permittivity |
|---|---|---|---|---|
| None | 0 | NPG | 0.50 | 2.5 |
| Vanlube 9317 | 2.0 | NPG | 5.9 | 73.0 |
| Stadis 450 | 0.5 | NPG | 200 | 747.0 |
| None | 0 | DOS | 0.50 | 2.3 |
| dibenzyl sebacate | 1.0 | DOS | 0.67 | 3.5 |
| dibenzyl sebacate | 3.0 | DOS | 0.53 | 2.8 |
| dibenzyl sebacate | 5.0 | DOS | 0.37 | 2.4 |
| diphenethyl sebacate | 1.0 | DOS | 0.50 | 2.8 |
| diphenethyl sebacate | 5.0 | DOS | 1.1 | 4.3 |
| dinaphthyl sebacate | 1.0 | DOS | 1.4 | 15.6 |
| dinaphthyl sebacate | 5.0 | DOS | 3.9 | 76.0 |

TABLE 2-continued

| Additive Compound | Percent by Weight | Base Oil | Conductivity (nS/m) | Relative Permittivity |
|---|---|---|---|---|
| (benzyl, 2-ethylhexyl) sebacate | 100 | None | 16 | — |
| (phenethyl, 2-ethylhexyl) sebacate | 100 | None | 14 | 349.0 |
| (phenethyl, 2-ethylhexyl) adipate | 100 | None | 66 | 720.0 |

The electrical properties of conductivity and relative permittivity derived from the data such as that shown in FIG. 6A-6B are listed in Table 2. The first three rows in Table 2 show the values for the typical fluid bearing base oil NPG, an oil formulated with an oligomeric amine antioxidant Vanlube 9317 that provides initially acceptable motor voltage and charge characteristics in magnetic recording systems, and a highly conductive experimental oil formulated with Stadis 450. The motor voltage on the oil made with Vanlube 9317 drifts over long periods of time as the antioxidant reacts with oil oxidation products and carbon radicals. The oil made with Stadis 450 has a high relative permittivity, which leads to high capacitance of the oil bearing. Since the conductivity is also high, the oil made with Stadis 450 allows for rapid discharge of excessive electric energy into the head disk interface. The oil made with Stadis 450 is unacceptable for use in magnetic recording disk drive motor bearings.

The next eight rows of Table 2 show the electrical properties of the DOS base oil with diaryl sebacate charge control additives. The pure diaryl sebacate charge control additives are solids at room temperature, and completely dissolve to form a clear solution in the base oil with mild heat and stirring on a Vortex mixer. The conductivity of the dibenzyl sebacate is not much improved over the DOS base oil. The conductivity of the 5% by weight diphenethyl sebacate is about twice that of the DOS base oil. The conductivity of the 5% by weight dinaphthyl sebacate is about 8 times higher than that of the DOS base oil, while the permittivity is comparable to that of the 2% by weight Vanlube 9317 in NPG. The 5% by weight dinaphthyl sebacate is an acceptable candidate for use in the magnetic recording disk drive fluid dynamic spindle motor bearing oil.

The last four rows of Table 2 show the properties of the asymmetric aryl sebacates. The asymmetric aryl sebacate compounds are liquid at room temperature, and appear to be slightly more viscous than the original DOS base oil. The conductivity of the (benzyl, 2-ethylhexyl) sebacate is about 32 times higher than that of the DOS base oil, while there was no measurable capacitance from the type of data shown in FIGS. 6A-6B. The last two rows in Table 2 illustrate the effect of using a lower molecular weight diacid. Changing the core diacid from C8 to C6 increased the conductivity by about 5× and the permittivity by only a factor of about 2×. This is due to the increased volumetric density of the aryl group which acts as the charge transfer group. These asymmetric oils may be used in some types of bearings which permit a slightly higher viscosity and viscous power dissipation. A lower viscosity asymmetric aryl ester that is liquid over the disk drive operating temperature may be obtained by optimization of the aryl group and acid molecular weight and structure.

The results in Table 2 show that increasing the number of aromatic rings in the polycyclic aromatic hydrocarbon charge control group from one as in dibenzyl or diphenethyl sebacate to two in dinapthyl sebacate increased the conductivity. From this it can be inferred that further increasing the number of aromatic rings in the polycyclic aromatic hydrocarbon to three or four, as in anthracene or pyrene, should further increase the conductivity of the oil. Specifically, four compounds made from the three and four ring polycyclic aromatics will also be useful as charge control additives. The structures of these compounds are shown in Table 3. The symmetric diesters dianthracenyl sebacate and dipyrenyl sebacate are expected to be solids at room temperature and can be used as additives in the lubricant base oil. The asymmetric esters (anthracenyl, 2-ethylhexyl) sebacate and (pyrenyl, 2-ethylhexyl) sebacate are expected to be liquid at room temperature and may be used as additive in the lubricant base oil or as the base oil itself when formulated with antioxidant and/or other antiwear additives.

invention may be devised without departing from the basic scope thereof, and the scope thereof is determined by the claims that follow.

What is claimed is:

1. A solution, comprising:
   a lubricant that includes a first acid reactant;
   a soluble charge control agent including a second acid reactant; and
   an antioxidant additive, wherein the first acid reactant and the second acid reactant are the same.

2. The solution of claim 1, wherein the first and second acid reactants are sebacic acid.

3. The solution of claim 2, wherein the soluble charge control agent is chemically attached to the lubricant through an esterification reaction.

TABLE 3

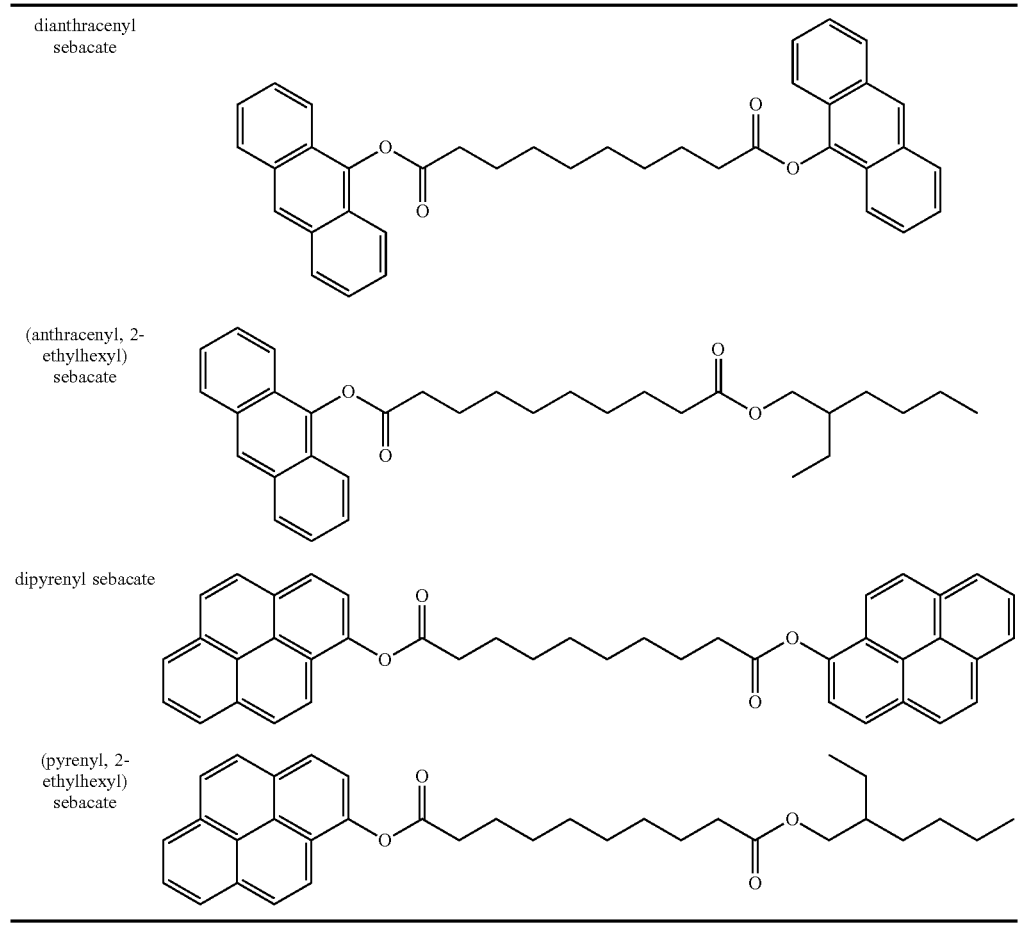

Overall, chemically attaching a charge transfer agent to the same diacid or core molecule used in the lubricant base oil forms a charge control agent that is soluble in the lubricant. Adding the soluble charge control agent and an antioxidant additive to the lubricant is an effective method of controlling the charge of the lubricant and providing stable electrical properties for the fluid dynamic bearing motor. Successfully controlling the charge of the lubricant further results in enhancing the effectiveness of IVC and yields an overall more reliable and improved magnetic recording system.

While the foregoing is directed to embodiments of the present invention, other and further embodiments of the 4. The solution of claim 3, wherein the soluble charge control agent is dibenzyl sebacate.

5. The solution of claim 4, wherein one reactant used in the esterification reaction is benzyl alcohol.

6. The solution of claim 3, wherein the soluble charge control agent is dinaphthyl sebacate.

7. The solution of claim 6, wherein one reactant used in the esterification reaction is naphthyl alcohol.

8. The solution of claim 3, wherein one reactant used in the esterification reaction is anthracene methanol.

9. The solution of claim 3, wherein one reactant used in the esterification reaction is pyrene methanol.

10. The solution of claim 1, wherein the soluble charge control agent is an asymmetric aryl ester.

11. The solution of claim 1, wherein the first and second acid reactants are a poly-acid.

12. The solution of claim 1, wherein the first and second acid reactants are a mono-acid.

13. The solution of claim 1, wherein the relative permittivity of the lubricant and soluble charge control agent solution is between about 2.5 and 200.

14. The solution of claim 1, wherein the relative permittivity of the lubricant and soluble charge control agent solution is less than 100.

15. The solution of claim 1, wherein the conductivity of the lubricant and soluble charge control agent solution is between about 1 and 100 nS/m.

16. The solution of claim 1, wherein the conductivity of the lubricant and soluble charge control agent solution is greater than 4 nS/m.

17. The solution of claim 1, wherein the soluble charge control agent is an aryl ester, the concentration of the aryl ester charge control agent being 0.1 to 10% by weight.

18. The solution of claim 17, wherein the concentration of the aryl ester charge control agent is between 1 and 5% by weight.

19. The solution of claim 1, wherein the soluble charge control agent is an asymmetric aryl ester or an asymmetric alkyl ester that is liquid at room temperature.

20. The solution of claim 19, wherein the asymmetric aryl ester or asymmetric alkyl ester is used as a base oil of the lubricant with a concentration of 90 to 100% by weight.

* * * * *